(12) United States Patent
Kawabata et al.

(10) Patent No.: US 11,512,965 B2
(45) Date of Patent: *Nov. 29, 2022

(54) VEHICLE CONTROL DEVICE WITH ROAD IDENTIFICATION

(71) Applicant: Hitachi Automotive Systems, Ltd., Hitachinaka (JP)

(72) Inventors: Akihiro Kawabata, Hitachinaka (JP); Tsuyoshi Akahoshi, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 11 days.

This patent is subject to a terminal disclaimer.

(21) Appl. No.: 17/040,696

(22) PCT Filed: Mar. 26, 2019

(86) PCT No.: PCT/JP2019/012694
§ 371 (c)(1),
(2) Date: Sep. 23, 2020

(87) PCT Pub. No.: WO2019/189083
PCT Pub. Date: Oct. 3, 2019

(65) Prior Publication Data
US 2021/0055115 A1    Feb. 25, 2021

(30) Foreign Application Priority Data

Mar. 30, 2018    (JP) .............................. JP2018-067455

(51) Int. Cl.
*G01C 21/32*    (2006.01)
*G01C 21/00*    (2006.01)
(Continued)

(52) U.S. Cl.
CPC ......... *G01C 21/32* (2013.01); *G01C 21/3602* (2013.01); *G01C 21/3815* (2020.08);
(Continued)

(58) Field of Classification Search
CPC ... G01S 19/485; G01C 21/32; G01C 21/3815; G01C 21/3848; G01C 21/3602; G06V 20/588

See application file for complete search history.

(56) References Cited

U.S. PATENT DOCUMENTS

2006/0111837 A1*   5/2006   Tauchi ................... G01C 21/32
                                                       340/995.12
2008/0021638 A1    1/2008   Kobayashi
                              (Continued)

FOREIGN PATENT DOCUMENTS

JP     2004341941 A  * 12/2004
JP     2008-026032 A    2/2008
                (Continued)

OTHER PUBLICATIONS

Machine Translation of JP2008032557A (Year: 2008).*
(Continued)

*Primary Examiner* — Rachid Bendidi
*Assistant Examiner* — Sahar Motazedi
(74) *Attorney, Agent, or Firm* — Foley & Lardner LLP

(57) ABSTRACT

The present invention provides a technique to accurately recognize a position of a vehicle even in a vicinity of a branch road or a junction road, neither of which is included in map data. The present invention provides a vehicle control device. When a vehicle is traveling on a road that is not described in map data, the vehicle control device is configured to determine whether or not the vehicle is traveling on a junction road or a branch road, based on a positional relationship between a position of the vehicle and a starting point of the junction road or a starting point of the branch road.

8 Claims, 5 Drawing Sheets

(51) Int. Cl.
*G01C 21/36* (2006.01)
*G01S 19/48* (2010.01)
*G06K 9/00* (2022.01)
*G06V 20/56* (2022.01)

(52) U.S. Cl.
CPC ........ *G01C 21/3848* (2020.08); *G01S 19/485* (2020.05); *G06V 20/588* (2022.01)

(56) References Cited

U.S. PATENT DOCUMENTS

| | | | |
|---|---|---|---|
| 2013/0311086 A1 | 11/2013 | Aoki | |
| 2015/0025802 A1* | 1/2015 | Kato | G01C 21/32 701/532 |
| 2015/0362326 A1 | 12/2015 | Fujimoto et al. | |

FOREIGN PATENT DOCUMENTS

| | | | |
|---|---|---|---|
| JP | 2008032557 A | * | 2/2008 |
| JP | 2008-134187 A | | 6/2008 |
| JP | 2012032269 A | * | 2/2012 |
| JP | 2013-156034 A | | 8/2013 |
| JP | 2013-238544 A | | 11/2013 |
| JP | 2014-238297 A | | 12/2014 |

OTHER PUBLICATIONS

Machine Translation of JP2012032269A (Year: 2012).*
Machine Translation of JP2004341941A (Year: 2004).*
Torre, et al., "Matching GPS Traces to (Possibly) Incomplete Map Data: Bridging Map Building and Map Matching", Proceedings of the 20th International Conference on Advances on Geographic Information Systems, ACM, Nov. 6, 2012, pp. 546-549.
Extended European Search Report issued in corresponding European Application No. 19777791.5 dated Nov. 11, 2021.
International Search Report with English translation and Written Opinion issued in corresponding application No. PCT/JP2019/012694 dated Jul. 9, 2019.

* cited by examiner

VEHICLE CONTROL DEVICE WITH ROAD IDENTIFICATION

TECHNICAL FIELD

The present invention relates to a vehicle control device configured to control an operation of a vehicle.

BACKGROUND ART

Currently, techniques for automatically driving a vehicle are actively developed. In automatic driving, it is important to determine a position where the vehicle currently is. Typically, in order to determine the position where the vehicle currently is, for example, a global navigation satellite system (GNSS) identifies a current coordinate of the vehicle, and further, a sensor identifies a direction of the vehicle.

When a vehicle control device assists a driver in driving the vehicle, the vehicle control device may usefully estimate, in addition to the position of the vehicle, on which lane of a road the vehicle is traveling. For example, in a case where the vehicle is traveling on a highway, the vehicle control device presumably distinguishes a main line from a branch road on the highway, and provides driving assistance in accordance with a type of the road.

PTL 1 below discloses a technique to recognize a position of a vehicle. An object of PTL 1 is to "provide a vehicle position recognition device to accurately map-match a current position of a vehicle even when a road that the vehicle is traveling branches off at a branch point". PTL 1 discloses a technique saying, "the present invention provides a vehicle position recognition device including: a GPS sensor configured to receive a GPS signal; a vehicle position identification unit configured to identify the position of the vehicle based on the GPS signal received by the GPS sensor; a map data storage unit configured to store map data; a branch-point-approaching determination unit configured to determine that the vehicle approaches the branch point (required to be determined) based on the map data stored in the map data storage unit; a radar device configured to measure a distance to an object at a side of the vehicle; and a branch determination unit configured to determine the branch point based on a result measured by the radar device, when the branch-point-approaching determination unit determines that the vehicle approaches the branch point (required to be determined)" (see Abstract).

PTL 2 below discloses a technique regarding car navigation. An object of PTL 2 is to "provide a navigation device configured to correct road data for a plurality of roads that run in parallel to each other, and configured to recognize a correct traveling road when a vehicle next travels on the plurality of roads". PTL 2 discloses a technique saying, "the navigation device includes: a map information storage means 103 configured to store road information; a position estimation means 111; a map matching means 112 configured to identify a plurality of candidate link points; a parallel-running road detection means 121 configured to detect each of links in parallel-running roads that run in parallel to each other, a traveling link determination means 122 configured to determine each of the links in the parallel-running roads, detected by the parallel-running road detection means 121, corresponds to which one of the following: a traveling link that the vehicle is traveling, and a parallel-running link that runs in parallel to the traveling link; a link position correction means 125 configured to obtain a position correction amount of a node in each of the traveling link and the parallel-running link, based on a distance between the candidate link point in accordance with the traveling link and the position of the vehicle estimated by the position estimation means 111" (see Abstract).

CITATION LIST

Patent Literature

PTL 1: JP 2014-238297 A
PTL 2: JP 2013-238544 A

SUMMARY OF INVENTION

Technical Problem

Typically, in the automatic driving and the car navigation, a position of a vehicle is acquired based on the GNSS, and the position of the vehicle is cross-checked with map data. As a result, a road or a lane that the vehicle is traveling is identified. However, for example, on a road such as a highway including a junction road that joins a main line from a public road or a branch road that branches off from the main line to the public road, the junction road or the branch road may not be described in the map data. Accordingly, in a vicinity of each of the junction road and the branch road, the position of the vehicle is prone to be wrongly recognized.

Each of PTL 1 and PTL 2 described above discloses the technique to recognize the position of the vehicle in the branch points or the parallel-running roads. However, in these conventional techniques, the position of the vehicle is prone to be wrongly recognized in a vicinity of roads that are not described in the map data; and the recognition error is not specifically solved.

In view of the respects described above, an object of the present invention is to provide a technique to accurately recognize the position of the vehicle even in the vicinity of the branch road or the junction road, neither of which is included in the map data.

Solution to Problem

The present invention provides a vehicle control device. When a vehicle is traveling on a road that is not described in map data, the vehicle control device is configured to determine whether or not the vehicle is traveling on a junction road or a branch road, based on a positional relationship between a position of the vehicle and a starting point of the junction road or a starting point of the branch road.

Advantageous Effects of Invention

The present invention provides a vehicle control device configured to accurately determine a position of a vehicle even when map data regarding a junction road or a branch road does not exist.

DESCRIPTION OF EMBODIMENTS

First Embodiment

Figure 1:
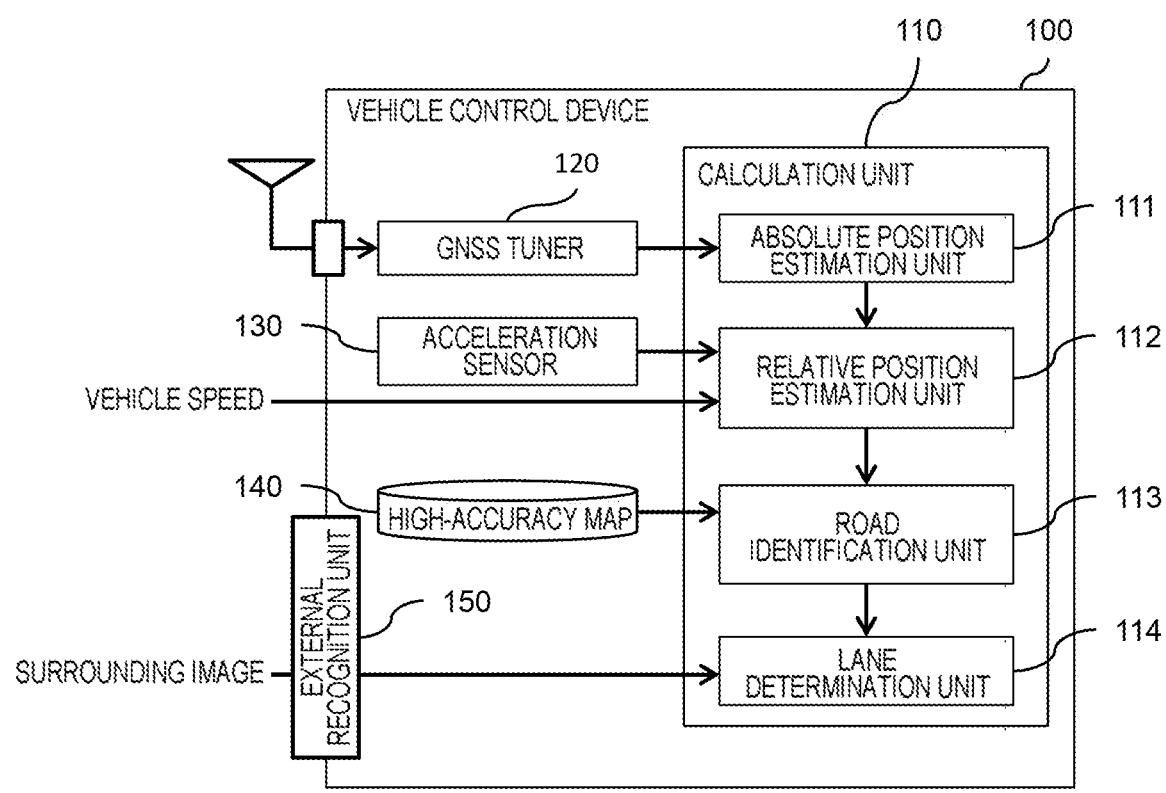
FIG. 1 is a configuration diagram of a vehicle control device 100 according to a first embodiment.

FIG. 1 is a configuration diagram of a vehicle control device 100 according to a first embodiment of the present invention. The vehicle control device 100 is a device installed in a vehicle and configured to control an operation of the vehicle. The vehicle control device 100 includes a calculation unit 110, a GNSS tuner 120, an acceleration sensor 130, a high-accuracy map 140, and an external recognition unit 150. The calculation unit 110 includes an absolute position estimation unit 111, a relative position estimation unit 112, a road identification unit 113, and a lane determination unit 114.

The GNSS tuner 120 acquires a position coordinate of the vehicle from a GNSS system. The position coordinate is acquired without using a state of the vehicle or surrounding information of the vehicle, and thus may be referred to as an absolute position. The acceleration sensor 130 measures acceleration of the vehicle. The high-accuracy map 140 corresponds to map information that is higher in position accuracy than the absolute position acquired by the GNSS tuner 120. The high-accuracy map 140 is previously stored in a storage device that the vehicle control device 100 includes. The high-accuracy map 140 stored here may be, for example, a coordinate of a road/lane. The external recognition unit 150 acquires information indicating a state of an external environment of the vehicle. The external recognition unit 150 acquires, for example, a surrounding image of the vehicle from a camera. Alternatively, the external recognition unit 150 may acquire the acceleration or vehicle speed of the vehicle.

Based on the position coordinate (absolute position) that the GNSS tuner 120 has acquired, the absolute position estimation unit 111 estimates the absolute position where the vehicle currently is. The relative position estimation unit 112 uses the information regarding the acceleration or the vehicle speed of the vehicle that the acceleration sensor 130 has acquired, so as to estimate the relative position of the vehicle based on the absolute position. In other words, the relative position of the vehicle represents a position of the vehicle that is higher in accuracy than the absolute position, and also has a role to complement the position coordinate acquired intermittently from the GNSS system. Each of the absolute position estimation unit 111 and the relative position estimation unit 112 estimates a direction of the vehicle, in addition to the position of the vehicle. Based on the high-accuracy map 140 and the surrounding image of the vehicle, the road identification unit 113 identifies a road (traveling road) that the vehicle is currently traveling. A process sequence will be described in detail later. The lane determination unit 114 compares each of the absolute position of the vehicle and the relative position of the vehicle with the high-accuracy map 140, so as to identify a lane (traveling lane) that the vehicle is currently traveling.

Figure 2:
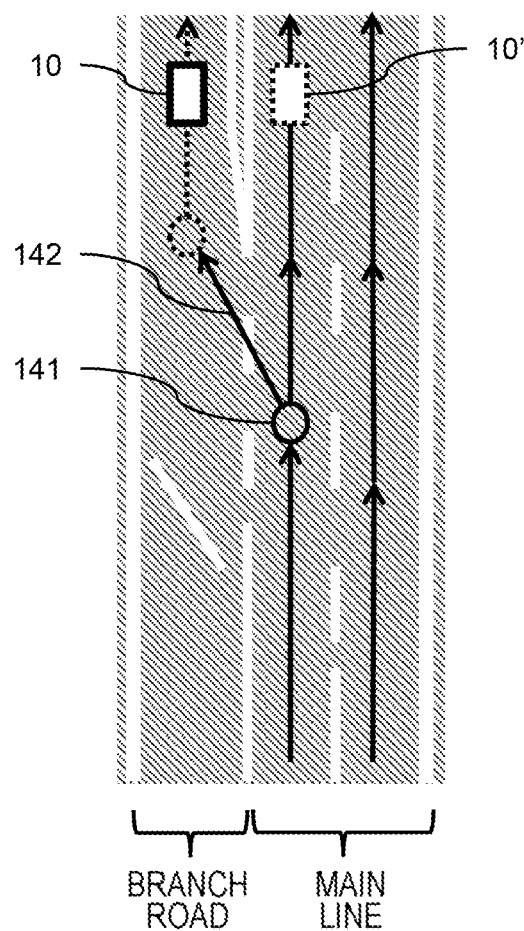
FIG. 2 illustrates an example of a highway including a main line and a branch road.

FIG. 2 illustrates an example of a highway including a main line and a branch road. Typically, on the highway, the branch road connects the main line to a public road. In a vicinity of a connection point between the main line and the branch road (near a center in FIG. 2), the branch road coexists as a new lane alongside a lane of the main line. Here, in the example illustrated in FIG. 2, the main line has two lanes and the branch road has a single lane.

When a vehicle 10 is traveling on the main line, the lane determination unit 114 determines on which one of the two lanes a vehicle 10 is traveling. Additionally, in the vicinity of the connection point, the lane determination unit 114 determines on which of the three lanes the vehicle 10 is traveling. The branch road only has the single lane, and thus, when the vehicle 10 is traveling on the branch road, the lane determination unit 114 desirably determines that the vehicle 10 is traveling on the lane of the branch road.

The high-accuracy map 140 shows the coordinate of the road/lane, for example, in a network structure. In other words, the high-accuracy map 140 describes roads and lanes by a collection of a node 141 and a link 142. However, in some cases, the high-accuracy map 140 may not describe information regarding the coordinate of the branch road. In the example of FIG. 2, the high-accuracy map 140 uses a link to describe a way from the main line to the branch road, but uses neither the link nor a node to describe other parts inside the branch road.

When the vehicle 10 is traveling on a road that is not described in the high-accuracy map 140, each of the road identification unit 113 and the lane determination unit 114 is prone to wrongly determine the road and the lane that the vehicle 10 is traveling. Particularly, in FIG. 2, the branch road and the main line run in parallel to each other, and the coordinate of the main line described in the high-accuracy map 140 exists in a vicinity of the vehicle 10. Accordingly, with regard to a position of the vehicle 10 in FIG. 2, each of the road identification unit 113 and the lane determination unit 114 is more prone to wrongly recognize the vehicle 10 as a vehicle 10' that is traveling on the main line. The first embodiment proposes a method to control such a recognition error.

When the vehicle 10 is traveling from the road described in the high-accuracy map 140 toward a coordinate not described in the high-accuracy map 140, the vehicle 10 is presumed to be heading toward the branch road from the main line. Accordingly, while the vehicle 10 is traveling, the road identification unit 113 acquires the position of the vehicle 10 and the direction of the vehicle 10, and concurrently, refers to the high-accuracy map 140 based on the position and the direction, so as to repeatedly determine whether or not the vehicle 10 is heading toward the road not described in the high-accuracy map 140 (i.e., the branch road in FIG. 2). For example, when the direction of the link 142 and the direction of the vehicle 10 have a difference less than or equal to a predetermined threshold value and when the coordinate of the link 142 and the position of the vehicle 10 have a difference less than or equal to a predetermined threshold value, it is possible to determine that the vehicle 10 is heading toward the branch road. In addition to the method described above, other appropriate methods may be used for the determination.

As one of other methods to determine whether or not the vehicle 10 approaches the node 141 or the link 142, the determination is made, for example, based on whether or not a sum of squares, i.e., a square of the difference in position and a square of the difference in direction, is less than or equal to a predetermined threshold value. For example, the squares, i.e., a square of the difference between the direction of the link 142 and the direction of the vehicle 10, and a square of the difference between the position of the link 142 and the position of the vehicle 10, are obtained, and then, the sum of the squares is compared with the predetermined threshold value. When the sum is calculated, an appropriate weight may be applied.

Even when the vehicle 10 is presumed to be heading toward the branch road, the vehicle 10 may temporarily face a direction of the branch road, and thus, the determination may be wrong. In view of this, the road identification unit 113 further determines whether or not the vehicle 10 has entered the branch road, based on a result of the determination that the lane determination unit 114 has made.

More specifically, the road identification unit 113 determines whether or not the vehicle 10 has changed the traveling lane from the lane of the main line (a center lane in FIG. 2) to the lane of the branch road (a left lane in FIG. 2), based on the result of the determination that the lane determination unit 114 has made. On determination that the vehicle 10 is heading toward the branch road and that the vehicle 10 has changed the traveling lane to the lane of the branch road, the road identification unit 113 determines that the vehicle 10 is traveling on the branch road.

As a method, based on which the lane determination unit 114 determines the traveling lane, the lane determination unit 114 basically uses results estimated by the absolute position estimation unit 111 and the relative position estimation unit 112. Concurrently, the lane determination unit 114 uses the surrounding image of the vehicle 10 to determine whether or not the vehicle 10 has changed the traveling lane. For example, the lane determination unit 114 presumably uses a type of lane marking lines of the lane that the vehicle 10 is traveling to determine the traveling lane. In addition to the method described above, other appropriate methods may be used for the determination.

First Embodiment: Summary

In the first embodiment, when the vehicle 10 is traveling toward the branch road that is not described in the high-accuracy map 140, the vehicle control device 100 determines whether or not the vehicle 10 has changed the traveling lane to the branch road. Then, based on the determination, the vehicle control device 100 determines whether or not the vehicle 10 is traveling on the branch road. With this configuration, even when the vehicle 10 is traveling on the branch road not described in the high-accuracy map 140, it is possible to control the recognition error where the vehicle 10 is wrongly determined to be traveling on the main line close to the branch road.

Second Embodiment

In the first embodiment, the methods to control the recognition error occurring when the vehicle 10 heads toward the branch road from the main line has been described. Similar recognition errors may occur when the vehicle 10 joins the main line from a junction road. Accordingly, in a second embodiment of the present invention, a method to accurately identify a road that a vehicle 10 is traveling (when the vehicle 10 joins a main line from the junction road) will be described. A vehicle control device 100 in this embodiment has a same configuration as in the first embodiment.

Figure 3:
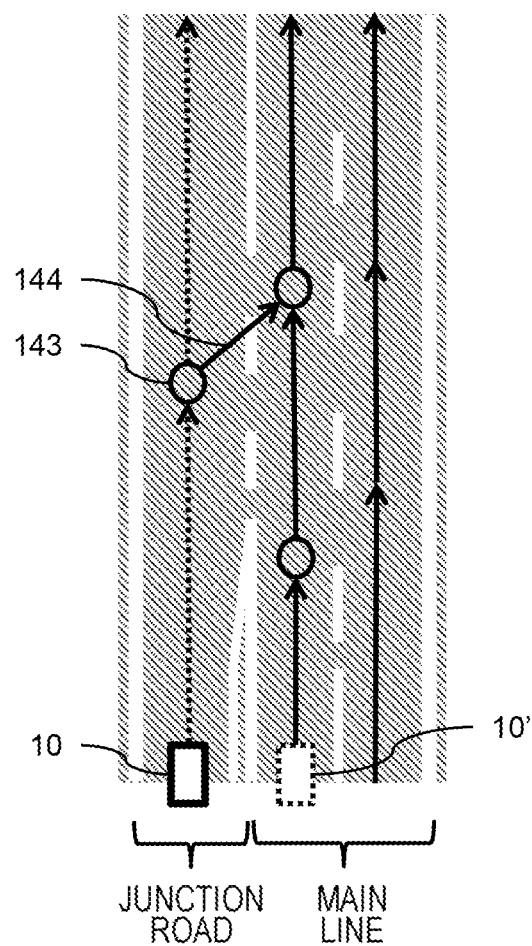
FIG. 3 illustrates an example of the highway including the main line and a junction road.

FIG. 3 is an example of a highway including the main line and the junction road. Typically, on the highway, the junction road connects a public road to the main line. Similarly to the branch road in the first embodiment, in a vicinity of a connection point between the main line and the junction road (near a center in FIG. 3), the junction road coexists as a new lane alongside a lane of the main line. Here, in the example illustrated in FIG. 3, the main line has two lanes and the junction road has a single lane.

In the second embodiment, a high-accuracy map 140 uses (i) a connection link 144 connecting the junction road to the main line and (ii) a starting point node 143 of the connection link 144 (end point of the connection link 144 on the junction road) in description, but uses neither the link nor the node to describe other parts inside the junction road.

When the vehicle 10 is traveling on such a junction road, each of a road identification unit 113 and a lane determination unit 114 is prone to wrongly determine a road and a lane that the vehicle 10 is traveling. For example, in FIG. 3, the junction road and the main line run in parallel to each other, and a coordinate of the main line described in the high-accuracy map 140 exists in a vicinity of the vehicle 10. Accordingly, with regard to a position of the vehicle 10 in FIG. 3, each of the road identification unit 113 and the lane determination unit 114 is more prone to wrongly recognize the vehicle 10 as a vehicle 10' that is traveling on the main line. The second embodiment proposes a process sequence to control such a recognition error.

(Process Sequence for Road Identification: Step 1)

When the vehicle 10 is traveling on a road that is not described in the high-accuracy map 140, the vehicle 10 may be traveling on a road such as the junction road in FIG. 3. In view of this, when the vehicle 10 is traveling on the road that is not identified in the high-accuracy map 140, the road identification unit 113 starts a process sequence for road determination according the second embodiment. Each of an absolute position estimation unit 111 and a relative position estimation unit 112 estimates the position of the vehicle 10, and then, the road identification unit 113 compares the result estimated with the high-accuracy map 140 to determine whether or not the vehicle 10 is traveling on the road not described in the high-accuracy map 140. For convenience of description, the road not described in the high-accuracy map 140 will be referred to as the junction road below.

(Process Sequence for Road Identification: Step 2)

The road identification unit 113 periodically searches, for example, at a predetermined time interval, whether or not a road described in the high-accuracy map 140 exists in the vicinity of the vehicle 10. More specifically, the road identification unit 113 compares the position and a direction where the vehicle 10 currently is with a position and a direction of each road described in the high-accuracy map 140, so as to search for the road in the vicinity of the vehicle 10. As long as the vehicle 10 is presumed to be traveling on the junction road, even when the road in the vicinity of the vehicle 10 is found, the road identification unit 113 does not immediately determine the road found as a traveling road. Instead, the road identification unit 113 follows a process sequence below.

(Process Sequence for Road Identification: Step 3)

The road identification unit 113 determines whether or not the road found in the vicinity of the vehicle 10 extends in a direction opposite to a direction that the vehicle 10 is traveling. More specifically, on the high-accuracy map 140, the road identification unit 113 may track a structure of the link to the road found in the direction opposite to the direction that the vehicle 10 is traveling. Note that, in this case, the high-accuracy map 140 has a configuration where the structure of the link may be tracked. When the road found extends in the direction opposite to the direction that the vehicle 10 is traveling, the road found may be the main line in FIG. 3. Here, in order to prevent the recognition error, such as where the vehicle 10 is wrongly recognized as the vehicle 10', the road identification unit 113 deletes the road found from potential candidates for the traveling road. In other words, the road identification unit 113 does not identify the traveling road at this moment.

(Process Sequence for Road Identification: Step 4)

The road identification unit 113 determines whether or not the starting point node 143 exists in the vicinity of the vehicle 10.

More specifically, in a network structure described in the high-accuracy map 140, the road identification unit 113 searches, in the vicinity of the position where the vehicle 10 currently is, for a node that satisfies conditions as follows: (i) including a link (that corresponds to the connection link 144 in FIG. 3) connecting to the other road (that corresponds to the main line in FIG. 3) described in the high-accuracy map 140; and (ii) not including links other than the link. The node described above presumably corresponds to a starting point of the junction road that is not described in the high-accuracy map 140. The road identification unit 113 further determines whether or not the vehicle 10 is traveling on the junction road toward the starting point node 143. When the vehicle 10 travels past the starting point node 143, another error may occur as will be described later in a third embodiment.

(Process Sequence for Road Identification: Step 5)

When finding the starting point node 143 in the step 4, the road identification unit 113 starts a process to identify the traveling road beyond the starting point node 143 (in other words, a node and a link extending from the starting point node 143 in the direction that the vehicle 10 is traveling). The road identification unit 113 suspends the process to identify the traveling road until the vehicle 10 has reached the starting point node 143.

By following the step 1 to the step 4 to identify the traveling road, only when the vehicle 10 travels beyond the starting point node 143 described in the high-accuracy map 140, the road identification unit 113 cross-checks the position of the vehicle 10 with the high-accuracy map 140. Accordingly, it is possible to control the recognition error, such as where the vehicle 10 is wrongly recognized as the vehicle 10'.

Figure 4:
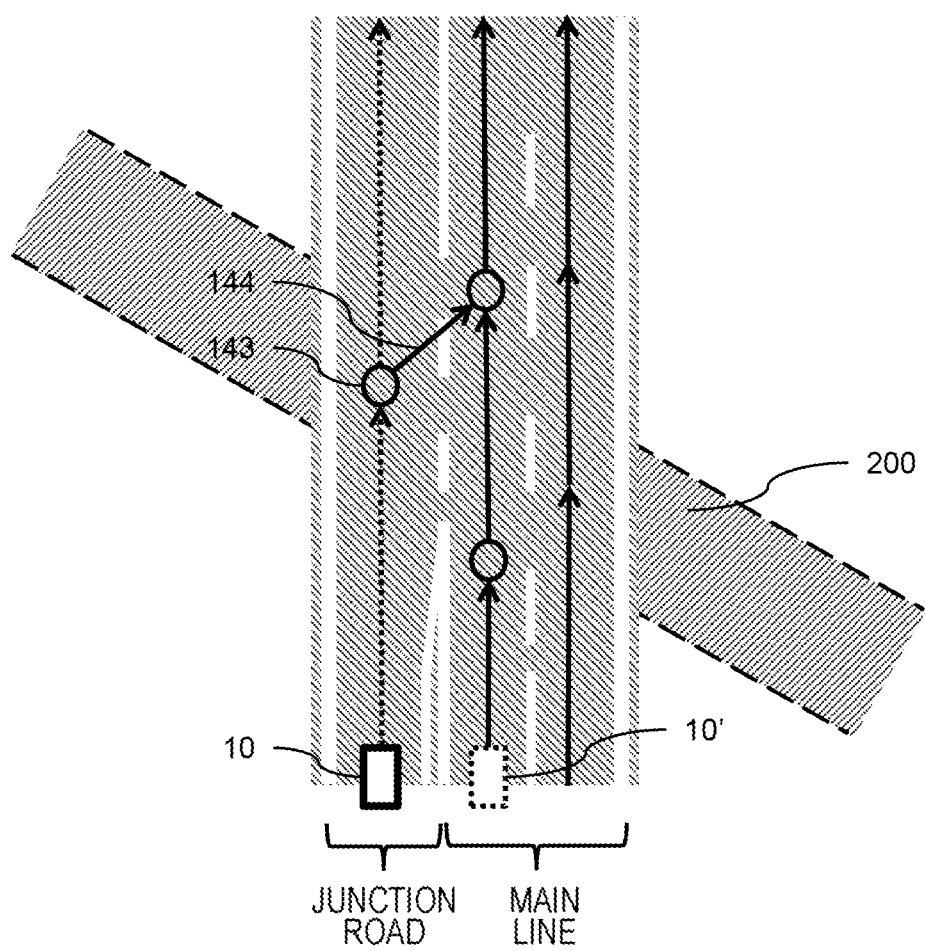
FIG. 4 illustrates an example of a road crossing the highway three-dimensionally.

FIG. 4 illustrates an example of a road crossing the highway three-dimensionally. When a crossroad 200 extends as in FIG. 4, the crossroad 200 exists on a same plane coordinate as the starting point node 143 in FIG. 3. In this case, when finding the starting point node 143, the road identification unit 113 may not be able to determine which one of the connection link 144 and the crossroad 200 extends from the starting point node 143. Accordingly, in such a case, the road identification unit 113 compares a direction of the connection link 144 with a direction of the crossroad 200. Then, when the direction of the crossroad 200 does not match the direction of the connection link 144, the road identification unit 113 removes the crossroad 200 from the potential candidates for the traveling road. With this configuration, the road identification unit 113 is less prone to wrongly recognize the crossroad 200 as the traveling road.

In FIG. 4, when a GNSS tuner 120 acquires a position of the vehicle 10 in a height direction and when the high-accuracy map 140 describes a configuration of roads in the height direction, the road identification unit 113 may use these pieces of information to remove the crossroad 200 from the potential candidates for the traveling road. When the position of the vehicle 10 in the height direction acquired by the GNSS tuner 120 is not sufficiently accurate, the road identification unit 113 may use the method described with reference to FIG. 4.

Second Embodiment: Summary

In the second embodiment, when vehicle 10 is traveling on the junction road that is not described in the high-accuracy map 140, and when the starting point node 143 and the connection link 144 are described in the high-accuracy map 140, the vehicle control device 100 starts the process to identify the traveling road from the starting point node 143. With this configuration, it is possible to control the recognition error where, in a vicinity of the starting point node 143 of the junction road, the main line close to the junction road is wrongly recognized as the traveling road, as in the case of the vehicle 10'.

In the second embodiment, even when finding an adjacent road in the vicinity of the vehicle 10, the vehicle control device 100 suspends identifying the adjacent road as the traveling road in a case where the adjacent road extends in the direction opposite to the direction that the vehicle 10 is traveling. With this configuration, even when the vehicle 10 is positioned on the junction road and relatively away from the starting point node 143, it is possible to control the recognition error where the adjacent road close to the junction road is wrongly recognized as the traveling road.

Third Embodiment

In the second embodiment, the methods to control the recognition error, where the position of the vehicle 10 is wrongly recognized during a period of time until the vehicle 10 reaches the starting point node 143 of the junction road, have been described. Similar recognition errors may occur even after the vehicle 10 travels past the starting point node 143. Accordingly, in a third embodiment of the present invention, a method to accurately identify a road that a vehicle 10 is traveling when the vehicle 10 travels past a starting point node 143 of a junction road, has been described. A vehicle control device 100 in this embodiment has a same configuration as in the first embodiment.

Figure 5:
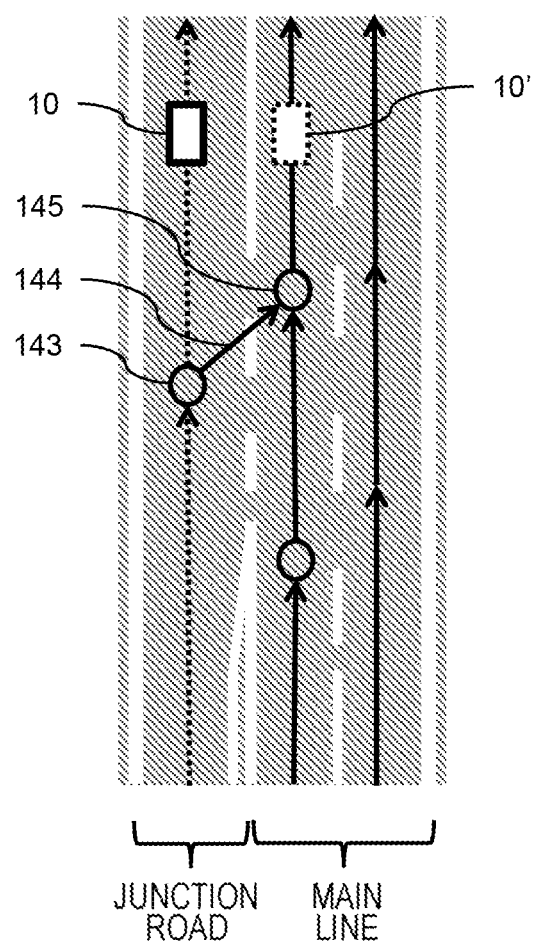
FIG. 5 illustrates another example of the highway including the main line and the junction road.

FIG. 5 illustrates an example of a highway including a main line and the junction road. The highway in FIG. 5 is the same as in FIG. 3, on an assumption that the vehicle 10 does not join the main line but travels past the starting point node 143. Here, a high-accuracy map 140 describes an end of a connection link 144 (a connecting point that connects the junction road to the main line) as an ending point node 145.

When the junction road extends beyond the starting point node 143 and runs in parallel to the main line on a route beyond the starting point node 143, each of a road identification unit 113 and a lane determination unit 114 is prone to wrongly determine the road and a lane that the vehicle 10 is traveling. For example, in FIG. 5, the junction road and the main line run in parallel to each other, and a coordinate of the main line described in the high-accuracy map 140 exists in a vicinity of the vehicle 10. Accordingly, with regard to a position of the vehicle 10 in FIG. 5, each of the road identification unit 113 and the lane determination unit 114 is more prone to wrongly recognize the vehicle 10 as a vehicle 10' that is traveling on the main line. The third embodiment proposes a process sequence to control such a recognition error.

(Process Sequence for Road Identification: Step 1)

The road identification unit 113 determines whether or not the vehicle 10 is traveling on a road that is not described in the high-accuracy map 140 (the road will be referred to as the junction road below for convenience of description). A specific method for the determination above may be, for example, the same as the step 1 in the second embodiment.

(Process Sequence for Road Identification: Step 2)

When the vehicle 10 is traveling on the junction road, the road identification unit 113 determines whether or not the vehicle 10 has traveled past both of the starting point node 143 and the ending point node 145. More specifically, the road identification unit 113 compares the position of the vehicle 10 with a position of each of the starting point node 143 and the ending point node 145, so as to determine whether or not the vehicle 10 has traveled past both of the starting point node 143 and the ending point node 145. It is possible to identify whether the vehicle 10 has traveled past both of the starting point node 143 and the ending point node 145 or the other nodes, by referring to a structure of nodes and links. For example, the method in the step 4 of the second embodiment may be applied.

(Process Sequence for Road Identification: Step 3)

When the vehicle 10 is traveling on the junction road and when the vehicle 10 has traveled past both of the starting point node 143 and the ending point node 145, the road identification unit 113 determines whether or not the vehicle 10 has traveled along the connection link 144. When determining whether or not the vehicle 10 has traveled along the connection link 144, the road identification unit 113 may use, for example, a method below. In addition to the method below, other appropriate methods may be used for the determination. Alternatively, these methods may be used in combination.

(Process Sequence for Road Identification: Step 3: Method for Determination 1)

The road identification unit 113 acquires a surrounding image of the vehicle 10, and uses the surrounding image to determine whether or not the vehicle 10 has traveled along the connection link 144. The main line of the highway is frequently located on an elevated roadway, and thus, is different in height from the junction road. In this case, the junction road is an uphill road. The road identification unit 113 determines whether or not the vehicle 10 has traveled on the uphill road based on the surrounding image. When the vehicle 10 has traveled on the uphill road, the vehicle 10 is presumed to have traveled along the connection link 144. Alternatively, the road identification unit 113 may determine whether or not the vehicle 10 has traveled on the junction road, by recognizing an image of a road sign indicating the junction road. Note that, when the high-accuracy map 140 includes coordinates covering for a plane coordinate as well as height information (e.g., a three-dimensional coordinate), the road identification unit 113 determines whether or not the vehicle 10 has traveled on the uphill road by cross-checking with the height information in the high-accuracy map 140. Here, the determination is more accurate.

(Process Sequence for Road Identification: Step 3: Method for Determination 2)

When the junction road is the uphill road, the road identification unit 113 determines whether or not the vehicle 10 has traveled along the connection link 144 in accordance with a result that an acceleration sensor 130 has measured. For example, when a period of time, during which a pitch angle of the vehicle 10 is tilted upward in front, has exceeded a predetermined threshold value, the vehicle 10 is presumed to have traveled on the uphill road. Note that, when the high-accuracy map 140 includes the coordinates covering for the plane coordinate as well as the height information (e.g., information regarding a tilt), the road identification unit 113 determines whether or not the vehicle 10 has traveled on the uphill road by cross-checking with the height information in the high-accuracy map 140. Here, the determination is more accurate.

(Process Sequence for Road Identification: Step 3: Method for Determination 3)

As a method to determine whether or not the vehicle 10 has traveled along the connection link 144, in addition to the method described above, other methods may be used. For example, the road identification unit 113 determines a curvature of the road based on the surrounding image or a change in direction of the vehicle 10 (e.g., a yaw rate). When the curvature of the road is within a certain range, the road identification unit 113 determines that the vehicle 10 has traveled on a ramp way (that is, as an example, a road configured: to connect a location to another location at a different height; to branch a location off from another location at a different height; or to merge a location with another location at a different height). The methods described above may be used in combination.

(Process Sequence for Road Identification: Step 3: Complement 1)

This step is intended for a case when the vehicle 10 is traveling on the route beyond the starting point node 143 in FIG. 5; in other words, this step is intended for a moment shortly after the vehicle 10 has traveled past the starting point node 143 and the ending point node 145. This step is not intended, for example, for a case when the vehicle 10 has left the junction road to reach a public road. Accordingly, on determination that the vehicle 10 has traveled past the starting point node 143 and the ending point node 145, the road identification unit 113 desirably follows this step immediately.

(Process Sequence for Road Identification: Step 3: Complement 2)

When the starting point node 143 and the ending point node 145 are relatively close to each other, the road identification unit 113 may not be able to immediately identify which one of the starting point node 143 and the ending point node 145 the vehicle 10 has traveled past. In such a case, it is difficult to determine whether the vehicle 10 has entered the main line and traveled past the ending point node 145 or the vehicle 10 is traveling on the junction road and has traveled past the starting point node 143 of the junction road. In view of this, the third embodiment proposes a useful method. When the starting point node 143 and the ending point node 145 are relatively away from each other and thus are clearly distinguishable, the road identification unit 113 may follow this step at a moment that the vehicle 10 has traveled past at least one of the starting point node 143 and the ending point node 145. Further, the road identification unit 113 may follow this step repeatedly until a predetermined period of time has elapsed since the vehicle 10 traveled past at least one of the starting point node 143 and the ending point node 145.

(Process Sequence for Road Identification: Step 3: Complement 3)

With regard to a positional relationship between the main line and the junction road, the junction road may be a downhill road or a combination of the uphill road and the downhill road; even in this case, the road identification unit 113 may follow this step in a similar method to the method above. Alternatively, other appropriate methods may be used in combination, or the method described above may be replaced with the other appropriate methods. For example, the road identification unit 113 may determine whether or not the vehicle 10 has traveled along the connection link 144 based on an appropriate signal received from a roadside sensor located on a side of the road.

(Process Sequence for Road Identification: Step 4)

On determination that the vehicle 10 has traveled along the connection link 144, the road identification unit 113 determines that the vehicle 10 is traveling on the main line. On determination that the vehicle 10 has not traveled along the connection link 144, the road identification unit 113 determines that the vehicle 10 is traveling on the junction road.

Third Embodiment: Summary

In the third embodiment, the vehicle control device 100 determines whether or not the vehicle 10 has traveled past at least one of the starting point node 143 and the ending point node 145. On determination that the vehicle 10 has traveled past at least one of the starting point node 143 and the ending point node 145, the vehicle control device 100 further determines whether or not the vehicle 10 has traveled past the connection link 144 in order to identify the traveling road. With this configuration, when the vehicle 10 has traveled past the starting point node 143 of the junction road, the vehicle control device 100 is less prone to wrongly recognize the main line close to the junction road as the traveling road.

Modification of the Present Invention

The present invention is not limited to the foregoing embodiments, and various modifications may be included. For example, a detailed description of each of configurations in the foregoing embodiments is to be considered in all respects as merely illustrative for convenience of description of the present invention, and thus is not restrictive. A configuration of an embodiment may be partially replaced with and/or may additionally include a configuration of other embodiments. Further, any addition, removal, and replacement of other configurations may be partially made to, from, and with a configuration in each embodiment.

Each of components, functions, processing units, processing means, or others in the foregoing embodiments may be partially or wholly incorporated into a hardware system, such as an integrated circuit design. Further, each of the components, the functions, or others may be incorporated into a software system where a processor interprets and executes a program regarding each of the functions. Information indicating each of the functions, such as the program, a table or a file, may be stored in a storage device, such as a memory, a hard disk, or a solid state drive (SSD). The information may alternatively be stored in a storage medium, such as an IC card or an SD card. Further, each of a control line and an information line is considered to be necessary for description purposes, and thus does not represent all the control lines and information lines of the product. Practically, it is to be understood that substantially all components are connected to each other.

REFERENCE SIGNS LIST 100 vehicle control device
110 calculation unit
111 absolute position estimation unit
112 relative position estimation unit
113 road identification unit
114 lane determination unit
120 GNSS tuner
130 acceleration sensor
140 high-accuracy map

The invention claimed is:

1. A vehicle controller configured to control an operation of a vehicle,
the vehicle controller comprising:
a processor; and
a map storage storing map data where coordinates of roads are described,
the processor configured to:
estimate a position of the vehicle;
by cross-checking the position of the vehicle with the map data, determine whether or not the vehicle is traveling on an off-map road that is not described in the map data,
based on a determination that the vehicle is traveling on the off-map road, determine whether or not a connecting link is described in the map data, and concurrently determine whether or not the vehicle is traveling on the off-map road toward the connecting link, wherein the connecting link is configured to connect the off-map road to an adjacent road that is adjacent to the off-map road,
by cross-checking the position of the vehicle with the map data, determine whether or not the adjacent road exists at a distance from the vehicle that is within a range of less than or equal to a predetermined threshold value,
when the adjacent road is determined to exist at the distance from the vehicle that is within the range of less than or equal to the predetermined threshold value, determine, based on the map data, whether or not the adjacent road extends in a direction opposite to a direction that the vehicle is traveling,
when the adjacent road extends in the direction opposite to the direction that the vehicle is traveling, remove the adjacent road from potential candidates for a traveling road that the vehicle is traveling on,
when the vehicle is traveling on the off-map road toward the connecting link and when the connecting link is described in the map data, determine whether or not the vehicle has traveled past at least any one of a starting point of the connecting link or an ending point of the connecting link,
based on a determination that the vehicle has traveled past at least any one of the starting point or the ending point, start identifying the traveling road based on a result of a determination of whether or not the vehicle has traveled along the connecting link, such that identifying the traveling road is suspended until the vehicle reaches the starting point, even when the adjacent road is determined to exist at the distance from the vehicle that is within the range of less than or equal to the predetermined threshold value, and
control the vehicle to be driven according to the identified traveling road.

2. The vehicle controller according to claim 1, wherein the processor is further configured to:
when a plurality of roads pass through the starting point, identify the connecting link based on whether or not each of the plurality of roads passing through the starting point extends in a direction connecting the off-map road to the adjacent road.

3. The vehicle controller according to claim 1, the processor is further configured to acquire information indicating a state of an external environment of the vehicle, and
by using the state of the external environment, determine whether or not the vehicle has traveled along the connecting link.

4. The vehicle controller according to claim 3, wherein the processor is further configured to:

by acquiring a surrounding image of the vehicle from a camera that photographs the surrounding image, recognize the state of the external environment of the vehicle, and by using the surrounding image, determine whether or not the vehicle has traveled on a road that connects roads at different heights, in order to determine whether or not the vehicle has traveled along the connecting link.

5. The vehicle controller according to claim 3, wherein the processor is further configured to:

by acquiring a signal indicating acceleration of the vehicle from an acceleration sensor that detects the acceleration, recognize the state of the external environment of the vehicle, and by using the acceleration, determine whether or not the vehicle has traveled on a road that connects roads at different heights, in order to determine whether or not the vehicle has traveled along the connecting link.

6. The vehicle controller according to claim 1, wherein the processor is further configured to:

by cross-checking the position of the vehicle with the map data, determine that the vehicle has traveled past at least any one of the starting point or the ending point.

7. The vehicle controller according to claim 1, further comprising:

an external sensor configured to acquire information indicating a state of an external environment of the vehicle, wherein the processor is further configured to:

by using a result of recognition by the external sensor, determine a traveling lane that the vehicle is traveling on among lanes that the traveling road includes, determine whether or not the vehicle is traveling toward a branch road that is not described in the map data from a road that is described in the map data, based on determining that the vehicle is traveling toward the branch road, determine whether or not the vehicle has changed the traveling lane to a side toward the branch road, and based on a determination that the vehicle has changed the traveling lane to the side toward the branch road, identify that the vehicle is traveling on the branch road.

8. The vehicle controller according to claim 7, wherein the processor is further configured to:

based on a global navigation satellite system (GNSS), estimate each of the position and a direction of the vehicle, and by comparing each of the position and the direction of the vehicle with each of a position and a direction of a link that is described in the map data, determine whether or not the vehicle is traveling toward the branch road, wherein the link is configured to connect the road that is described in the map data to the branch road.

* * * * *